US009503711B2

(12) United States Patent
Iversen et al.

(10) Patent No.: US 9,503,711 B2
(45) Date of Patent: Nov. 22, 2016

(54) REDUCING ANGULAR SPREAD IN DIGITAL IMAGE PROJECTION

(71) Applicant: IMAX Corporation, Mississauga (CA)

(72) Inventors: Steen Svendstorp Iversen, Kongens Lyngby (DK); John W. Bowron, Oakville (CA)

(73) Assignee: IMAX Corporation, Mississauga, Ontario ( * ) Notice: Subject to any disclaimer, the term of this patent is extended or adjusted under 35 U.S.C. 154(b) by 0 days.

(21) Appl. No.: 14/351,816

(22) PCT Filed: Oct. 19, 2012

(86) PCT No.: PCT/IB2012/055754
§ 371 (c)(1),
(2) Date: Apr. 14, 2014

(87) PCT Pub. No.: WO2013/057717
PCT Pub. Date: Apr. 25, 2013

(65) Prior Publication Data
US 2014/0300708 A1 Oct. 9, 2014

Related U.S. Application Data

(60) Provisional application No. 61/549,601, filed on Oct. 20, 2011.

(51) Int. Cl.
*G03B 21/14* (2006.01)
*H04N 13/04* (2006.01)
(Continued)

(52) U.S. Cl.
CPC ...... *H04N 13/0459* (2013.01); *G02B 27/0025* (2013.01); *G03B 21/147* (2013.01);
(Continued)

(58) Field of Classification Search
CPC ............ G02B 27/0025; G03B 21/147; H04N 13/0422; H04N 13/0429; H04N 13/0431; H04N 13/0459; H04N 5/7416; H04N 9/3147; H04N 9/3158; H04N 9/3161; H04N 9/317; H04N 9/3182; H04N 9/3185; H04N 9/3194
See application file for complete search history.

(56) References Cited

U.S. PATENT DOCUMENTS

| 4,523,226 A | 6/1985 | Lipton et al. |
| 4,868,773 A | 9/1989 | Coyle et al. |

(Continued)

FOREIGN PATENT DOCUMENTS

| CN | 1367883 | 9/2002 |
| CN | 1417637 | 5/2003 |

(Continued)

OTHER PUBLICATIONS

U.S. Appl. No. 13/806,105, Non Final Office Action mailed Oct. 10, 2014, 11 pages.
(Continued)

*Primary Examiner* — Sultan Chowdhury
*Assistant Examiner* — Magda Cruz
(74) *Attorney, Agent, or Firm* — Kilpatrick Townsend & Stockton LLP

(57) ABSTRACT

Chromatic aberration can be reduced and extreme projection angles can be allowed in a projection system by modifying one color channel of light having a wavelength bandwidth with image data to produce imaged light, causing the imaged light to spread angularly when displaying the imaged light through an optical distorting element onto a screen, and reducing angular spread of the imaged light exiting the optical distorting element by adjusting the wavelength bandwidth.

15 Claims, 9 Drawing Sheets

(51) Int. Cl.
  *G02B 27/00* (2006.01)
  *H04N 9/31* (2006.01)
  *H04N 5/74* (2006.01)
  *G03B 37/06* (2006.01)

(52) U.S. Cl.
  CPC ............ *H04N5/7416* (2013.01); *H04N 9/317* (2013.01); *H04N 9/3147* (2013.01); *H04N 9/3158* (2013.01); *H04N 9/3161* (2013.01); *H04N 9/3182* (2013.01); *H04N 9/3185* (2013.01); *H04N 9/3194* (2013.01); *G03B 37/06* (2013.01); *H04N 13/0422* (2013.01); *H04N 13/0429* (2013.01); *H04N 13/0431* (2013.01)

(56) References Cited

U.S. PATENT DOCUMENTS

| | | | |
|---|---|---|---|
| 5,070,403 | A | 12/1991 | Wilkinson |
| 5,384,869 | A | 1/1995 | Wilkinson et al. |
| 5,561,474 | A | 10/1996 | Kojima et al. |
| 5,631,975 | A | 5/1997 | Bouchard et al. |
| 5,654,805 | A | 8/1997 | Boon |
| 5,663,775 | A | 9/1997 | Kawamura et al. |
| 5,920,652 | A | 7/1999 | Wilkinson |
| 6,018,596 | A | 1/2000 | Wilkinson |
| 6,222,593 | B1 | 4/2001 | Higurashi et al. |
| 6,243,070 | B1 | 6/2001 | Hill et al. |
| 6,396,505 | B1 | 5/2002 | Lui et al. |
| 6,538,705 | B1 | 3/2003 | Higurashi et al. |
| 6,703,988 | B1 | 3/2004 | Fergason et al. |
| 6,733,138 | B2 | 5/2004 | Raskar |
| 6,751,006 | B2 | 6/2004 | Zhou et al. |
| 6,760,075 | B2 | 7/2004 | Mayer et al. |
| 6,804,406 | B1 | 10/2004 | Chen |
| 6,843,564 | B2 | 1/2005 | Putilin et al. |
| 6,984,043 | B2 | 1/2006 | Nakamura et al. |
| 7,002,533 | B2 | 2/2006 | Sayag |
| 7,079,157 | B2 | 7/2006 | Deering |
| 7,097,311 | B2 | 8/2006 | Jaynes et al. |
| 7,111,941 | B2 | 9/2006 | Allen et al. |
| 7,127,084 | B1 | 10/2006 | Mauk |
| 7,339,625 | B2 | 3/2008 | Matthys et al. |
| 7,357,517 | B2 | 4/2008 | Hasegawa |
| 7,660,470 | B2 | 2/2010 | Yano |
| 7,676,072 | B2 | 3/2010 | Sugiyama |
| 7,740,361 | B2 | 6/2010 | Jaynes et al. |
| 7,852,327 | B2 | 12/2010 | Chen et al. |
| 7,866,832 | B2 | 1/2011 | Jaynes et al. |
| 7,891,818 | B2 | 2/2011 | Christensen et al. |
| 7,936,361 | B2 | 5/2011 | Aufranc et al. |
| 7,954,954 | B2 | 6/2011 | Aufranc et al. |
| 8,016,426 | B2 | 9/2011 | Artonne et al. |
| 8,453,148 | B1 | 5/2013 | Hobbs et al. |
| 8,567,953 | B2 | 10/2013 | O'Dor et al. |
| 8,842,222 | B2 | 9/2014 | Iversen |
| 8,944,612 | B2 | 2/2015 | Chang et al. |
| 2001/0024231 | A1 | 9/2001 | Nakamura et al. |
| 2002/0027608 | A1 | 3/2002 | Johnson et al. |
| 2002/0196538 | A1* | 12/2002 | Lantz .................. H04N 9/3141 359/443 |
| 2004/0001184 | A1 | 1/2004 | Gibbon et al. |
| 2004/0085256 | A1 | 5/2004 | Hereld et al. |
| 2004/0184007 | A1 | 9/2004 | Silverstein et al. |
| 2004/0239885 | A1 | 12/2004 | Jaynes et al. |
| 2005/0036673 | A1 | 2/2005 | Ohba et al. |
| 2005/0082990 | A1 | 4/2005 | Elliott et al. |
| 2005/0083402 | A1 | 4/2005 | Klose |
| 2006/0033890 | A1 | 2/2006 | Hasegawa |
| 2006/0221249 | A1 | 10/2006 | Lin et al. |
| 2007/0024764 | A1 | 2/2007 | Chung |
| 2007/0091277 | A1 | 4/2007 | Damera-Venkata et al. |
| 2007/0132965 | A1 | 6/2007 | Damera-Venkata et al. |
| 2007/0133794 | A1 | 6/2007 | Cloutier et al. |
| 2007/0171380 | A1 | 7/2007 | Wright et al. |
| 2007/0285663 | A1 | 12/2007 | Hewitt et al. |
| 2008/0101725 | A1 | 5/2008 | Lin et al. |
| 2008/0143969 | A1 | 6/2008 | Aufranc et al. |
| 2008/0143978 | A1 | 6/2008 | Damera-Venkata et al. |
| 2008/0266321 | A1 | 10/2008 | Aufranc et al. |
| 2008/0297451 | A1 | 12/2008 | Marcu et al. |
| 2008/0309884 | A1 | 12/2008 | O'Dor et al. |
| 2009/0027304 | A1 | 1/2009 | Aufranc et al. |
| 2009/0102915 | A1 | 4/2009 | Arsenich |
| 2009/0213337 | A1 | 8/2009 | Kondo et al. |
| 2009/0244684 | A1 | 10/2009 | Gollier |
| 2009/0273719 | A1 | 11/2009 | Kuwata et al. |
| 2009/0278918 | A1 | 11/2009 | Marcus et al. |
| 2010/0008568 | A1 | 1/2010 | Curti et al. |
| 2010/0103379 | A1 | 4/2010 | Fiess |
| 2010/0177112 | A1 | 7/2010 | Miyasaka et al. |
| 2010/0201682 | A1 | 8/2010 | Quan et al. |
| 2011/0057943 | A1 | 3/2011 | Ivashin et al. |
| 2011/0199586 | A1 | 8/2011 | Morikuni |
| 2011/0234920 | A1 | 9/2011 | Nelson |
| 2011/0309999 | A1 | 12/2011 | Chang et al. |
| 2012/0176415 | A1 | 7/2012 | Chao |
| 2013/0093805 | A1 | 4/2013 | Iversen |
| 2013/0201403 | A1 | 8/2013 | Iversen |
| 2014/0192076 | A1 | 7/2014 | Tan et al. |
| 2014/0292817 | A1 | 10/2014 | Iversen et al. |
| 2016/0165199 | A1 | 6/2016 | Tan et al. |

FOREIGN PATENT DOCUMENTS

| | | |
|---|---|---|
| CN | 1532586 | 9/2004 |
| CN | 1598690 | 3/2005 |
| CN | 1735173 | 2/2006 |
| CN | 1846213 | 10/2006 |
| CN | 1988674 | 6/2007 |
| CN | 101180873 | 5/2008 |
| CN | 101507286 | 8/2009 |
| CN | 102123292 | 7/2011 |
| DE | 2827622 | 1/1980 |
| DE | 19545356 | 5/1996 |
| EP | 899688 | 3/1999 |
| EP | 1297488 | 4/2003 |
| EP | 1460856 | 9/2004 |
| JP | 09046553 | 2/1997 |
| JP | 2000184317 | 6/2000 |
| JP | 2006054532 | 2/2006 |
| JP | 2008539675 | 11/2008 |
| JP | 2009206665 | 9/2009 |
| JP | 2009260932 | 11/2009 |
| JP | 2011040958 | 2/2011 |
| RU | 2165192 | 4/2001 |
| RU | 2168192 | 5/2001 |
| WO | 9621171 | 7/1996 |
| WO | 2004039085 | 5/2004 |
| WO | 2006116536 | 11/2006 |
| WO | 2010147451 | 12/2010 |
| WO | 2011134834 | 11/2011 |
| WO | 2011160629 | 12/2011 |
| WO | 2013024430 | 2/2013 |
| WO | 2013057714 | 4/2013 |
| WO | 2013057717 | 4/2013 |

OTHER PUBLICATIONS

"XLM HD30—The ultimate high-brightness projector for high-resolution multi-windowing", URL:http://www.projectorcentral.com/pdf/projector_spec_3403.pdf, XP55014864, Jul. 1, 2006, 4 pages.

Jacobson et al., "Linear Fusion of Image Sets for Display", IEEE Transactions on Geoscience and Remote Sensing, IEEE Service Center, Piscataway, NJ, US, vol. 45, No. 10, XP011192516, ISSN: 0196-2892, DOI : 10.1109/TGRS, Oct. 1, 2007, pp. 3277-3288.

Li et al., "Optical blending for multi-projector display wall systems", IEEE LEOS 12th Annual Meeting Conference Proceedings, Leos' 99, vol. 1, XP010361258, DOI : 10.1109/LEOS: 978-0-7803-5634-4, Nov. 8, 1999, 2 pages.

(56) References Cited

OTHER PUBLICATIONS

Mayer, "Design Considerations and Applications for Innovative Display Options Using Projector Arrays", Proceedings of SPIE—The International Society for Optical Engineering, vol. 2650, Jan. 1996, pp. 131-139.
Okatani et al., "Study of Image Quality of Superimposed Projection Using Multiple Projectors", IEEE Transactions on Image Processing, IEEE Service Center, vol. 18, No. 2, XP011249562, ISSN: 1057-7149, Feb. 2009, pp. 424-429.
PCT/IB/2012/055754, "International Search Report and Written Opinion", mailed Feb. 19, 2013, 7 pages.
Seo et al., "Double-Layer Projection Display System Using Scattering Polarizer Film", Japanese Journal of Applied Physics, vol. 47, No. 3, XP55011651, ISSN: 0021-4922, DOI : 10.1143/JJAP. 47.1602, Mar. 2008, pp. 1602-1605.
U.S. Appl. No. 13/641,676, Final Office Action mailed on Apr. 28, 2014, 9 pages.
U.S. Appl. No. 13/641,676, Notice of Allowance mailed on Jun. 10, 2014, 6 pages.
European Application No. 12841614.6, Extended European Search Report mailed on Jul. 15, 2015, 13 pages.
Paschotta, Anamorphic Prism Pairs, Encyclopedia of laser physics and technology, Oct. 2008, 2 pages.
Roth et al., 0.2: Wide Gamut, High Brightness Multiple Primaries Single Panel Projection Displays, SID Symposium digest of technical papers 34, May 1, 2003, pp. 118-121.
Chinese Application No. 2012800513707, Office Action mailed on Sep. 25, 2015, 14 pages (7 pages for the original document and 7 pages for the English translation).
Cotting et al., Embedding Imperceptible Patterns into Projected Images for Simultaneous Acquisition and Display, Proceedings of the third IEEE and ACM International Symposium on Mixed and Augmented Reality, Nov. 2, 2004, pp. 100-109.
Zollmann et al., Digital Illumination for Augmented Studios, Journal of Virtual Reality and Broadcasting, Dec. 1, 2006, 10 pages.
Zollmann et al., Imperceptible Calibration for Radiometric Compensation, Eurographics, Jan. 1, 2007, 4 pages.
Chinese Patent Application No. 201280051370.7, Second Office Action mailed Jul. 12, 2016, 10 pages (5 pages for the English translation and 5 pages for the original document).

* cited by examiner

REDUCING ANGULAR SPREAD IN DIGITAL IMAGE PROJECTION

CROSS-REFERENCE TO RELATED APPLICATIONS

This is a U.S. national phase under 35 U.S.C. 371 of International Patent Application No. PCT/IB2012/055754 entitled "Distortion Compensation for Image Projection," filed Oct. 19, 2012, which claims benefit of priority under PCT Article 8 of U.S. Provisional Application No. 61/549,601, filed Oct. 20, 2011, each of which is incorporated herein by reference in its entirety.

TECHNICAL FIELD

The present invention relates generally to image projection systems and, more particularly (although not necessarily exclusively), to projection systems for compensating for image distortion.

BACKGROUND

In stereoscopic planetarium projection, two approaches have been pursued: (1) a rectangular "inset" image is projected in the front of a dome by a single projector or a pair of left eye/right eye perspective image projectors located behind the audience, near the edge of the dome and (2) multiple projectors, located near the edge of the dome, project an edge-blended image that covers the whole or most of the dome, often with blend zones in the central areas of interest in the projected image.

An inset image may not take full advantage of the immersive nature of a projection dome. On the other hand, edge blended systems with multiple projectors at multiple locations can be complicated to install and maintain well aligned.

Therefore, a single projector system or dual left eye/right eye perspective projector system where the projector(s) are located behind the audience in the rear of the dome, and illuminate(s) a large enough section of the dome to create an immersive, "frameless" feeling is desirable.

Further, it is desirable to use standard cinema components, including standard cinema three-dimensional (3D) glasses and 3D glasses handling equipment, in order to keep operational costs down.

SUMMARY

Certain aspects and features relate to reducing chromatic aberration and allowing extreme projection angles in a projection system.

In one aspect, a method of digital projection includes modifying one color channel of light having a wavelength bandwidth with image data to produce imaged light. The imaged light is caused to spread angularly when the imaged light is displayed through an optical distorting element onto a screen. Angular spread of the imaged light exiting the optical distorting element is reduced by adjusting the wavelength bandwidth.

At least one feature includes the optical distorting element being a single prism anamorphic adaptor.

At least one feature includes modifying a magnification of the imaged light in the vertical dimension by the single prism anamorphic adaptor.

At least one feature includes modifying a magnification of the imaged light in the horizontal dimension by the single prism anamorphic adaptor.

At least one feature includes modifying a second color channel of light with the image data. The image data is modified to cause the imaged light of at least one color channel exiting the optical distorting element to converge on a screen with imaged light from the second color channel exiting the optical distorting element by a color warping processor.

At least one feature includes designing into light source emissions a required wavelength bandwidth of light of the at least one color channel.

In another aspect, a system for digital projection includes a spatial light modulator, a projection lens, and a single prism anamorphic adaptor. The spatial light modulator can modify light having a wavelength bandwidth and from at least one color channel with image data to produced imaged light. The projection lens can project the imaged light. The single prism anamorphic adaptor is at the output of the projection lens. Imaged light can be projected for display on a screen through the single prism anamorphic adaptor. The single prism anamorphic adaptor can cause the light from the at least one color channel to spread angularly.

At least one feature includes a light source that can be designed to include a required wavelength bandwidth into emissions of the light source.

At least one feature includes a laser light source as the light source.

At least one feature includes a laser diode light source as the laser light source.

At least one feature includes a color warping processor that can cause the imaged light exiting the single prism anamorphic to converge on the screen with second imaged light from a second color channel exiting the single prism anamorphic adaptor by modifying the image data.

At least one feature includes the screen as a dome screen.

At least one feature includes the system disposed in a dual projector system.

At least one feature includes the spatial light modulator being a 4K spatial light modulator. The wavelength bandwidth of a light source for one color can be reduced to less than ten nanometers.

At least one feature includes the wavelength bandwidth of a light source can be reduced to less than twenty nanometers.

These illustrative aspects and features are mentioned not to limit or define the invention, but to provide examples to aid understanding of the inventive concepts disclosed in this disclosure. Other aspects, advantages, and features of the present invention will become apparent after review of the entire disclosure.

DESCRIPTION

Figure 1A:
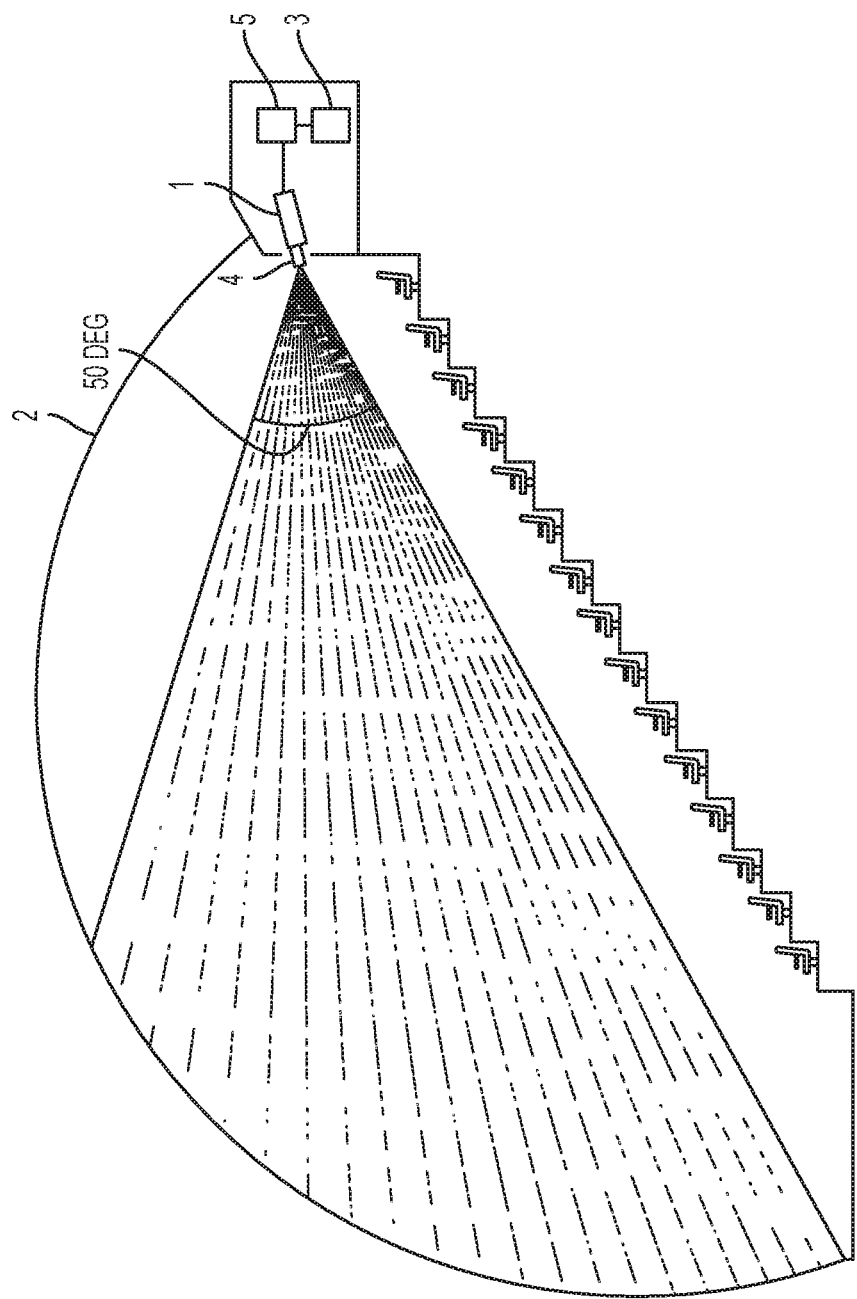
FIG. 1A shows a side view of a projection system environment according to one aspect of the present invention.
Figure 1B:
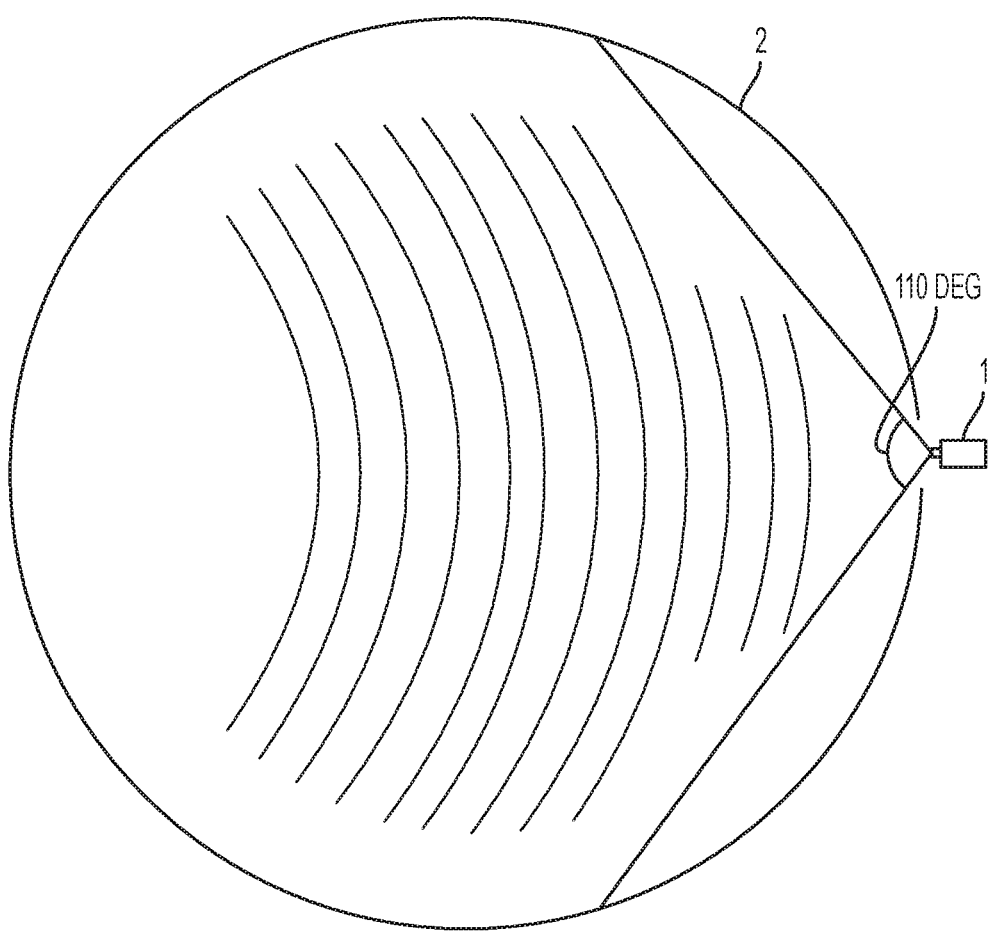
FIG. 1B shows a top view the projection system in FIG. 1A according to one aspect of the present invention.

FIG. 1A and FIG. 1B show side and top views, respectively, of a first aspect of the invention. A projection system is shown that includes a digital projector 1 located near the edge of a dome-shaped projection surface 2, and an image generator 3. The projector 1 can project an image onto the dome-shaped projection surface 2. The projector 1 can include at least one image forming element with an aspect ratio R, which may be approximately 16:1 or approximately 17:1, and a projection objective with a horizontal emission angle of approximately 110 degrees and a vertical emission angle of at least 45 degrees, for example 50 degrees or 60 degrees. The projection objective may include a prime lens 4, which may be a wide angle or fish eye objective. Objectives may be designed with a mechanical aperture small enough to ensure that none of the image is clipped at the edges by the lens elements, i.e. some light rays of the edges of the image fall beside one or more lens elements. In some configurations, the wide angle or fish eye objective may have a mechanical aperture that is larger than one or more of the lens elements, clipping some rays, but allowing more light rays to pass through the center of the lens, resulting in a non-uniform brightness with light level falling off towards the edges of the image, an effect also known as "vignetting". This may not be desirable in projections on flat projection screens, such as in cinemas, but in dome projection it can enable better light utilization at the center of interest of the projected image and at the same time reduce light levels at the dome edges in the peripheral part of the vision of the observers, thereby reducing cross reflections in the dome, which again may reduce the effective contrast in the center of interest of the projected image and which may otherwise result in low-contrast unpleasing images where colors appear unsaturated or "flat."

A configuration according to one aspect may further include an electronic image warping system 5 that can perform a geometric correction of the images being input to the projector 1 so that a technician can calibrate the projected images for a best possible experience compromise for the viewers located in different seats, including maintaining an essentially straight horizon for as many viewers as possible. This process may compensate for both distortion in the projection objective and the distortion caused by viewing the projected images off of the projection axis.

Figure 2:
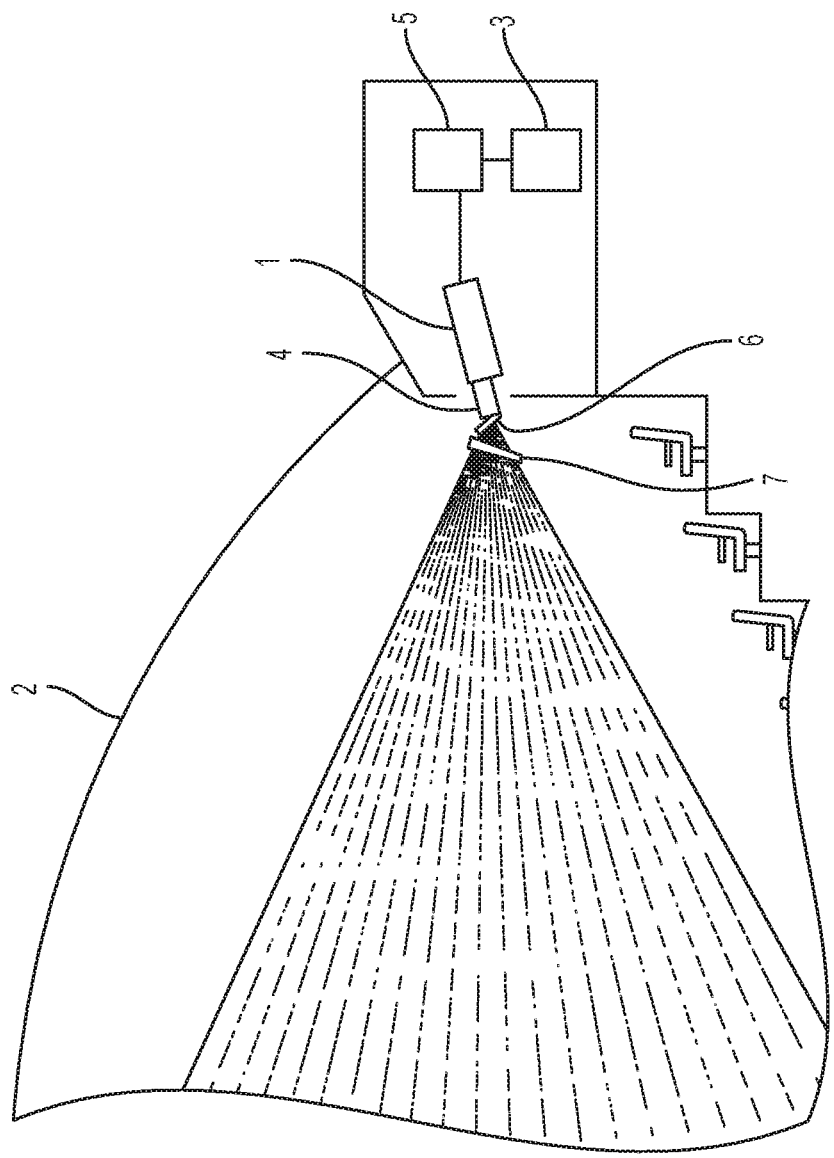
FIG. 2 shows a side view of part of the projection system environment of FIG. 1A including an anamorphic prism pair according to one aspect of the present invention.

FIG. 2 shows a configuration according to the first aspect in which an anamorphic adaptor that includes a first prism 6 and a second prism 7 is located in front of the prime lens 4. In other aspects, the first prism 6 and the second prism 7 are replaced with cylindrical lenses. The prime lens 4 may have essentially equal magnification in the horizontal and vertical directions and the anamorphic adaptor may be oriented so it stretches the image in the vertical direction, resulting in a bigger magnification factor of the projection objective in the vertical than in the horizontal direction. This can enable the first aspect to have a larger projected area onto the dome without having to increase also the magnification in the horizontal direction and thereby have pixels that are not projected onto the screen (for example being masked out or simply projected onto a dark region outside of the projection dome). Avoiding un-projected pixels can result in better utilization of the pixels, hence better utilization of available projection illumination and resolution.

The projector 1 may include a spectrum separation stereoscopic system that can cause the spectrum of the emitted light from the projector 1 to have essentially discrete and narrow red, green and blue wavelength bands, and the audience may wear 3D glasses with spectrum separation filters. The spectrum separation system may include a rotating filter wheel that may filter transmitted light alternately between two spectra, a static filter, a solid state alternating filter or a laser illumination system with a static or alternating light spectrum.

The image warping system 5 may be capable of performing separate geometric corrections for each of the primary colors, allowing the technician to adjust the color convergence calibration of the red, green and blue image planes, for example by using a white calibration grid, thereby reducing the visual blurring aberration caused by chromatic aberration in the prime lens 4 and in the anamorphic adaptor. When the spectrum separation stereoscopic system is used, and the emitted spectrum therefore consists of narrow red, green and blue wavelength bands, it may be possible by the convergence calibration to reduce the blurring by chromatic aberration effectively. This, in turn, can reduce the need to use optical means in the prime lens 4 and the anamorphic adaptor to compensate for chromatic aberration.

In a configuration of the first aspect, the spectrum separation stereoscopic system can alternate the emitted spectrum between a first spectrum and a second spectrum. The image generator 3 can output alternately left eye and right eye perspective images and the image warping system 5 can alternate synchronously between a first color convergence calibration and a second color convergence calibration. Two separate color convergence calibrations can be adjusted by the technician. This may be done, for example, as follows: 1) a white grid is projected as the left eye image, a black image is projected as the right eye image, and the red and blue geometry is calibrated until the best possible color convergence, 2) a green grid is projected as both left and right eye perspective images and the green geometry of the second color convergence is calibrated to the best possible convergence between the two spectra of green, 3) a red grid is projected as both left and right eye perspective images and the red geometry of the second color convergence is calibrated to the best possible convergence between the two spectra of red, 4) a blue grid is projected as both left and right eye perspective images and the blue geometry of the second color convergence is calibrated to the best possible convergence between the two spectra of blue. This way all six wavelength bands (red, green and blue of the first and second spectrum) are converged such that, if identical images are fed as left eye perspective and right eye perspective image, a monoscopic image can be observed without eyewear, in which the aberration is reduced. The color convergence calibrations may be stored as separate geometry corrections that can be performed after a general geometry correction is performed that is calibrated for best experience compromise (i.e. straight horizon etc.). The performance of those two successive geometry corrections may be performed such that the resulting geometry correction for each of the six wavelength bands is first computed, then the color planes are resampled to avoid successive resamplings and the associated quality loss.

In an alternative configuration, a second projector with a second prime lens and a second anamorphic adaptor, a second image generator and a second image warping system are added. The projector 1 can emit light of a first spectrum and the second projector can emit light of a second spectrum. In this configuration, the color convergence can be calibrated for each projector separately in the respective image warping systems.

In FIG. 2, the anamorphic adaptor may be a traditional configuration of a prism pair. One purpose of a larger prism in such a traditional anamorphic adaptor is to counteract the chromatic aberration created in the smaller prism. With a horizontal projection angle of 110 degrees, the second prism can become very large and heavy and may result in a complicated and expensive practical implementation.

Figure 3:
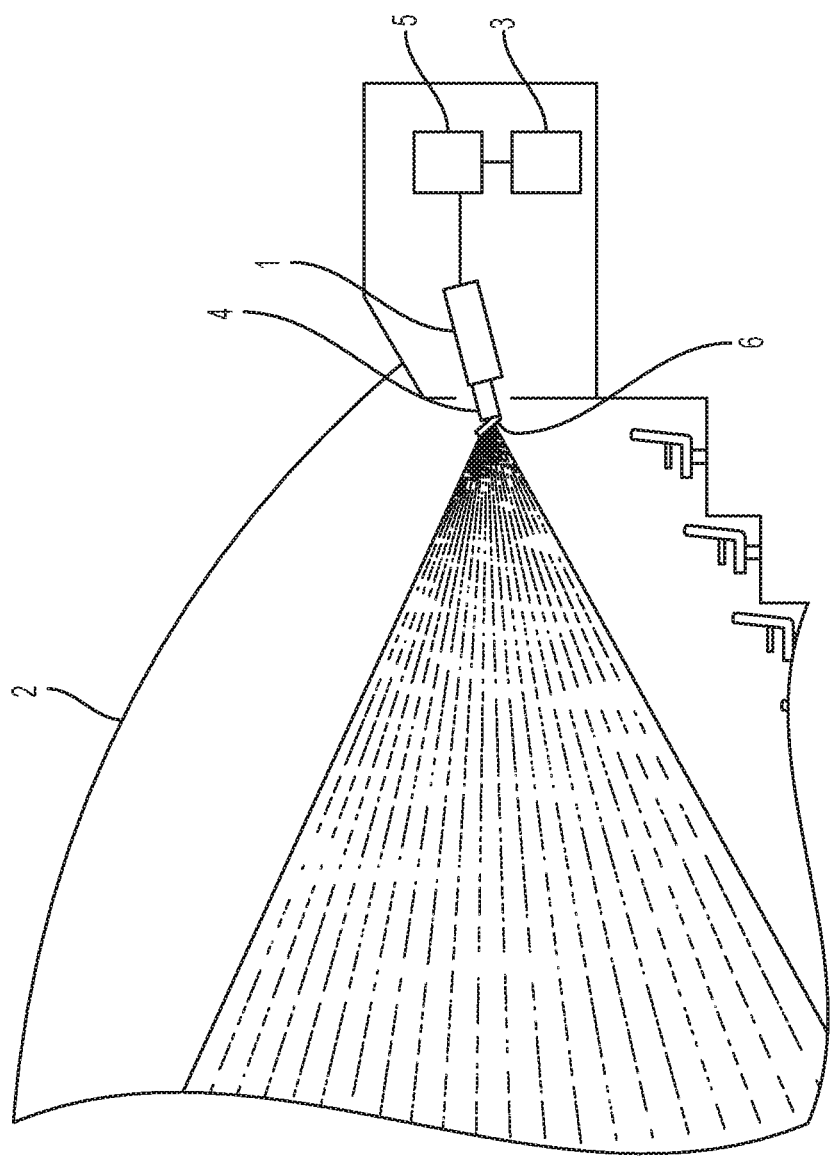
FIG. 3 shows a side view of part of the projection system environment of FIG. 1A in which a second prism is eliminated according to one aspect of the present invention.

FIG. 3 shows a configuration of the spectrum separation stereoscopic system. The image warping system 5 can perform separate geometric corrections for each of the primary colors. The second prism 7 used in FIG. 2 can be eliminated. The visual effects of the chromatic aberration can be eliminated by calibrating the color convergence. The prism can be located in a mount such that the vertical angle can be adjusted. Further, the mount may be constructed such that the prism can be changed. It may be possible, for example, to change between triangular prisms of different angles. By selecting between prisms of different angles and/or by adjusting the vertical angle of the prism, different vertical amplification can achieved. It may also be possible to select a degree of non-linear amplification along the vertical axis that is larger than normally desired in anamorphic adaptors but may be desired in this configuration of dome projection. For example, it may be desirable to have higher magnification in the top as compared to the bottom, which may yield more resolution and brightness in the central viewing area than in the peripheral vision area in the top of dome depending on the content projected and type of experience that site is promoting to its audience. The image warping 5 may correct for the geometric distortion created by non-linear magnification in the vertical direction. The result of the non-linear magnification may be that geometry is conserved, but resolution and brightness reduced in the top of the dome, hence utilizing more of the available illumination and resolution in the center of interest and reducing contrast-reducing cross reflections onto the center of interest.

After selecting a new prism and/or adjusting the angle, both the general geometry calibration for best experience and the color convergence can be performed again. In one configuration, a link can be established between the selection and adjustment of prisms such that the geometrical corrections can follow the selected prism and angle. For example, sensors may sense the selected prism and angle and send information data to the warping system 5, which can select a relevant pre-calibrated geometry correction. Alternatively, a servo system may adjust the prism angle. The servo system and the warping system can be operated and synchronized by a control system.

The projector 1 may be a 3 chip 4K DLP™ cinema projector with 1.38" DMD chips, for example a Christie CP4230 or a Barco DP4K. The prime lens 4 may be a fisheye objective with a focal length of app. 15 mm and an f# of 2.4. The aperture of the objective may be larger than that of some of the individual lens elements, which may increase brightness at the center (vignetting) and reduce brightness relatively in peripheral vision areas, hence reduce cross reflections in the dome. The spectrum separation stereoscopic system may be a Dolby™ 3D, Panavision 3D or Infitec alternating filter wheel or non-alternating filter. The warping system may be the geometry functions included in the $7^{th}$ Sense "Delta" media server. The anamorphic adaptor may consist of a single triangular prism with an angle of 10 degrees located in front of the prime lens with an adjustable vertical angle and the thinner edge facing down. The vertical angle may be adjusted depending on how big a fraction of the dome is desired to be covered with projected image, and may for example be set to 25 degrees. For example, a prism can be n-BK7 glass with a wedge angle of 8.7 degrees and can produce a 33% image stretch in one direction.

When significant image stretches (e.g. a 33% vertical image stretch) are used, the selected prism may cause significant angular color separation as the light exits the prism. Even though the position of convergence of light from each color channel can be adjusted by image warping unit 5 in FIG. 3, another problem may occur in which the narrow wavelength bandwidth of color spreads apart further angularly to create a fatter pixel. Image warping may not correct for a fatter pixel problem. For example, using the n-BK7 glass prism with a 8.7 degree wedge angle can cause a pixel in a projection system with a 4 k resolution image modulator to become fatter in one direction by as much as 66%. This scenario can be calculated for green light with a center wavelength of 532 nanometers and a bandwidth of +/−10 nanometers.

For example, each projected image pixel that is stretched by the single prism anamorphic adaptor and displayed on a screen can include three separate color pixel images to form a pixel image on the screen. Each color channel can have a bandwidth of wavelengths of light. The bandwidth of wavelengths of light for one color can converge on the space of one pixel on the screen. If the prism separates color to a greater extreme, the light associated with a color channel may spread out further angularly when exiting the prism, causing the displayed pixel to become fatter. The fatter the pixel becomes for each color pixel, blur can become apparent to a viewer, which is undesirable. The wider the wavelength bandwidth of light of one color entering a single prism, the greater the angular spread of the light exiting the prism and the fatter the pixel. When the wavelength bandwidth of light of one color channel is reduced, there may be less angular spread of the light exiting the prism. Since image warping unit 5 is not able to compensate for Pixel blur, other solutions may be needed. Using a second prism in series with the first prism to compensate for color separation can be done, but the second prism may be large and not a practical option. An alternate solution may be to adjust or reduce the bandwidth of the wavelengths of light for each color channel. However, the tradeoff can mean losing more light for the displayed image. Projection systems may use wideband light sources where color channels are created by color separating optical elements, such as a Philip's prism or color filters such as in a rotating color wheel. There can be a diminishing return between stretching the image with a single prism and image brightness to maintain image quality. For projection systems that rely on wideband light sources, further narrowing of the bandwidth for each color can be done but may not be an acceptable solution when further stretching of an image is performed. Another approach is to use very narrow band light sources, such as laser light sources in a projection system, with a single prism anamorphic projection adaptor. The laser source can have a very narrow bandwidth of wavelengths of light that can be used with a single prism element in combination with the warping unit 5 to correct for color shift on the display. A laser-based system can extend the stretch capability of the single prism element and the warping unit can compensate for the extra image color shift, between color channels when displaying a stretched image.

For example, lasers with a +/−1 nanometer wavelength bandwidth about the center frequency can be used with a single prism anamorphic lens for virtually any amount of color separation and therefore any amount of image stretch. Another factor such as speckle can be considered when using very narrow band laser sources.

One potential disadvantage of very narrow band laser sources is the amount of light speckle that these sources produce. Light speckle from a laser light source may appear on a display as an undesirable visible image artifact. The amount of speckle that can be observed may increase as the light wavelength bandwidth of the laser decreases. One approach to reducing speckle can be to increase the bandwidth of wavelengths of the laser light source. However, increased bandwidth can lead to a fat pixel problem for an extreme image stretch when using a single prism anamorphic adaptor. The bandwidth of wavelength of the laser source used in an extreme image stretch may be based on a compromise between the amount of speckle produced and the degree a pixel becomes blurred or fattened.

In the application of 3D projection that is a spectrum separating stereoscopic system using spectral encoding of the left and right eye image, each projected image can have a different narrow bandwidth of wavelengths of red, green and blue light. The maximum bandwidth of wavelengths of two different bandwidths in the same color channel, one for each eye image, can be limited by the full range of the red or green or blue color spectrum considered acceptable for each color channel. For example, wavelength limits of a red color channel can be defined in terms of what is considered to produce an acceptable viewing result for red colored images. Within this bandwidth range, two narrower wavelength bandwidths with a center frequency wavelength can be defined with sufficient wavelength separation between the two center frequencies and associated bandwidth to prevent undesirable color channel crossover. If the maximum bandwidth is limited to 20 nanometers at each of the two center frequencies, the maximum pixel expansion of a fat pixel can be limited to within 66% with the example prism stated earlier. If a single prism anamorphic adaptor creates unacceptable fat pixel blur below the maximum bandwidth of each of the different bandwidths of wavelengths in the described 3D projection system, then bandwidth of the laser light source can be further limited. For example, the bandwidth of wavelengths of the laser light may be limited to less than 20 nanometers such as 10 nanometers to reduce the fat pixel further in the example above. When the pixel resolution of an image modulator such as a spatial light modulator of a projection system, is increased, for example to be higher than 4 k, the size of the pixel for a given display area can become smaller and the bandwidth of wavelengths before unacceptable pixel blur occurs can be narrower.

Figure 4:
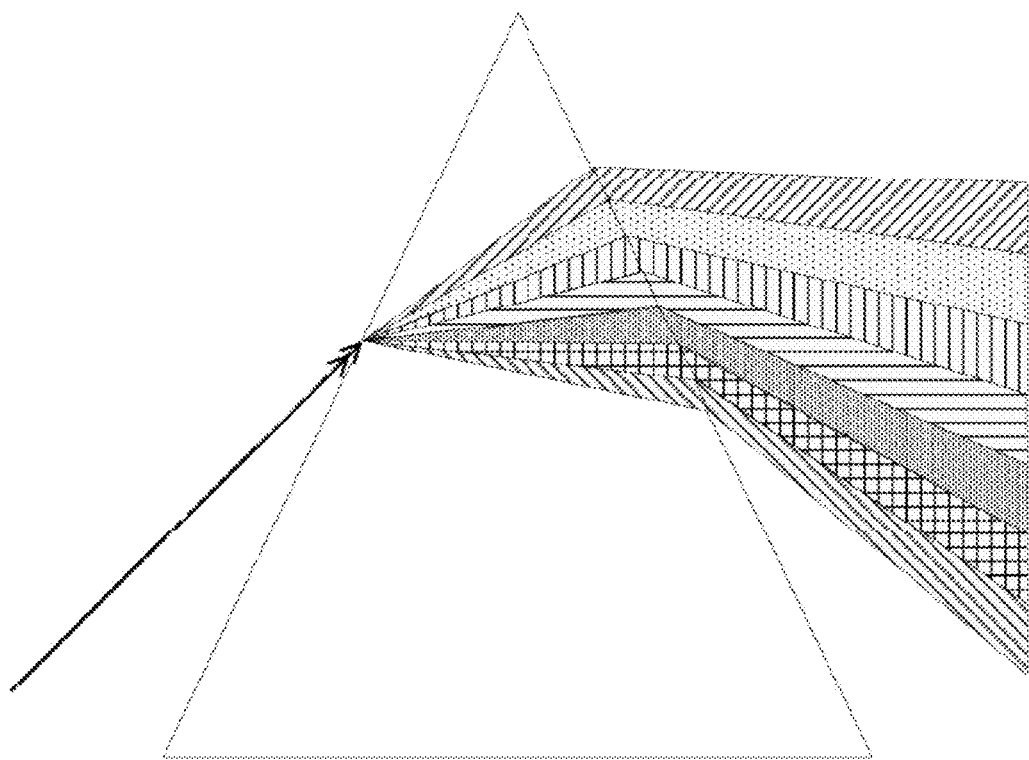
FIG. 4 shows an example of chromatic aberration according to one aspect of the present invention.

FIG. 4 shows an example the effects of the chromatic aberration in the anamorphic prism. The prism angle and aberration is exaggerated here for illustrative purposes. A good quality prism located near infinite focus of projection objective and having its angle adjusted for moderate stretch can exhibit little of the different types of aberration, except for chromatic aberration that may be significant. The small beam is dispersed into a much wider beam, which in turn can create a significant blur on the screen.

Figure 5:
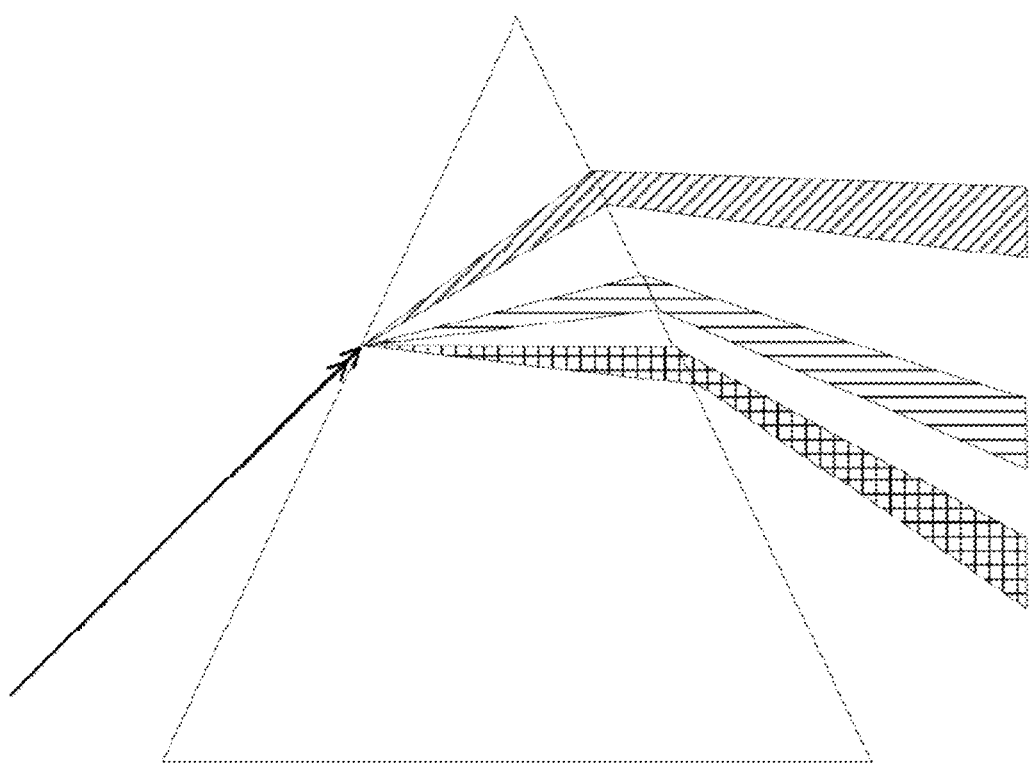
FIG. 5 shows chromatic aberration with a narrowband filter inserted according to one aspect of the present invention.

FIG. 5 shows the aberration with a narrowband filter, such as a Dolby™ 3D filter wheel, inserted. Some of the spectrum is removed and remaining are three narrow beams corresponding to the three narrow bands transmitted by the narrowband filter. Since the beams are separated spatially, the amount of blur is only reduced slightly. A wide wavelength bandwidth of light can exit the prism with a large angular spread, as shown in FIG. 4. By narrowing the wavelength bandwidth that enters the prism, light can exit with much less angular spread, as shown in FIG. 5.

Figure 6:
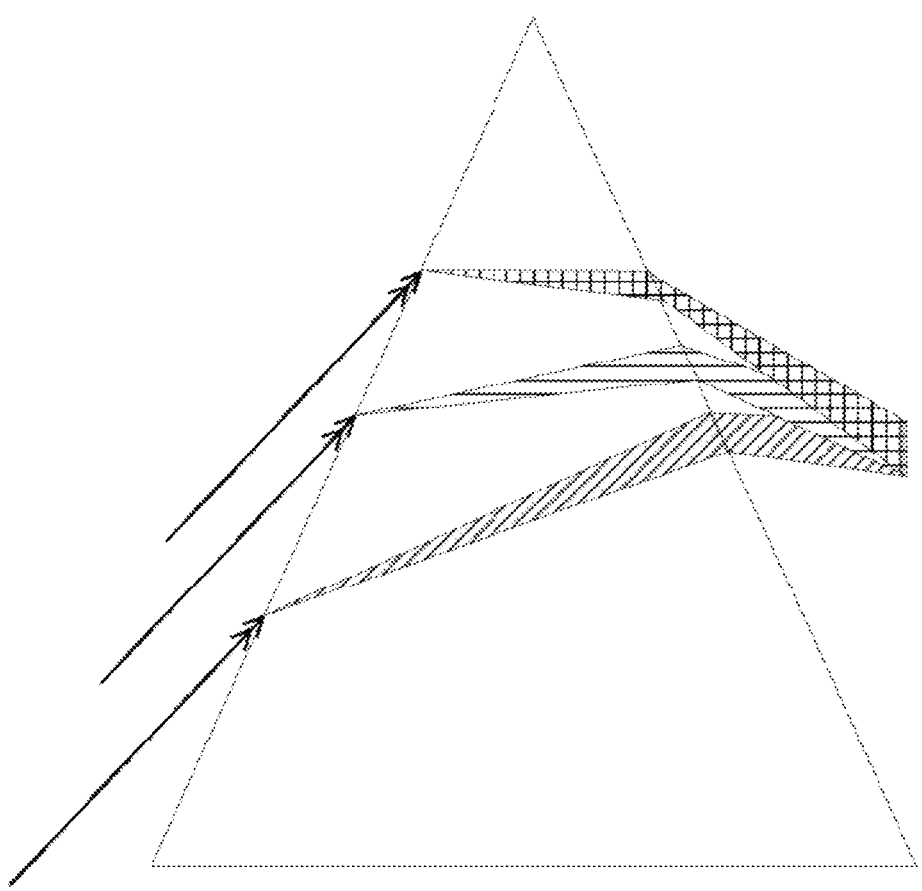
FIG. 6 shows chromatic aberration compensated by filtering and convergence according to one aspect of the present invention.

FIG. 6 shows the aberration again in which the projected image is digitally corrected geometrically, for example by the warping unit 5 in FIG. 3, in each of the three color planes for color convergence. The three narrow beams hit on top of each other on the projection surface. Hence, the blur can be significantly reduced.

When a single prism increases the angular spread of wavelengths of light of each of the three colors in FIG. 6 by an amount that causes visual blurring artifacts associated with a fat pixel problem, the following method can be applied to control the fat pixel problem.

Figure 8:
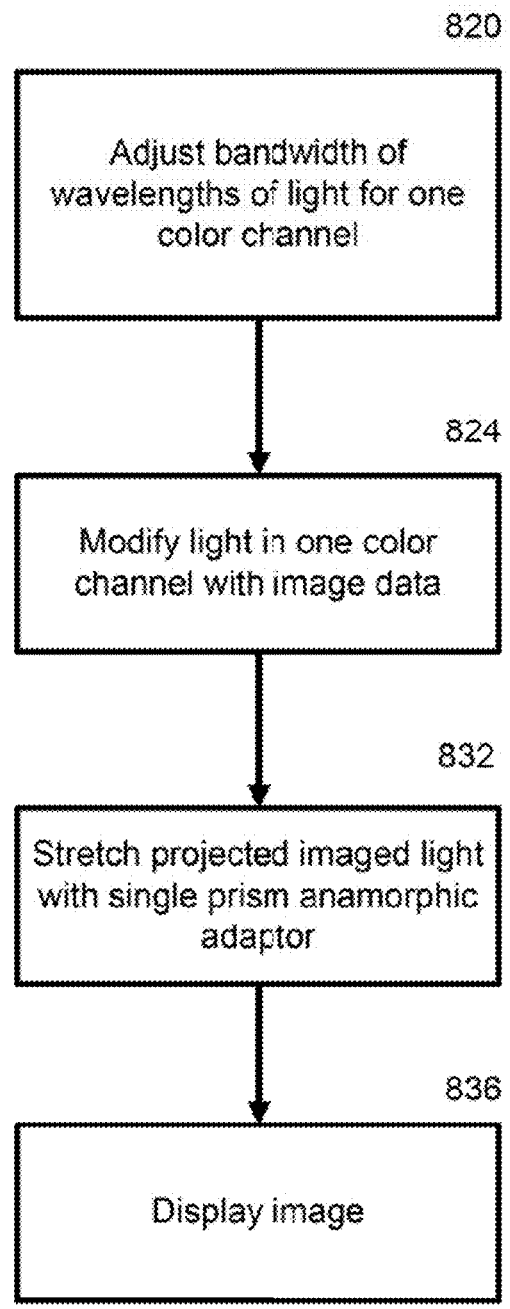
FIG. 8 shows a method for modifying light for display according to one aspect of the present invention.

FIG. 8 illustrates a method of projection using an optical distorting element such as a single prism anamorphic adaptor. One example of a projection system with a single prism anamorphic element usable for performing the method of FIG. 8 is the projection system shown in FIG. 3. Other projection systems may of course be used.

In block 820, the wavelength bandwidth of light for one color channel is adjusted. In some aspects, the wavelength bandwidth is adjusted after an image is displayed using light that has been stretched using a single prism anamorphic adapted and modified in at least one color channel with image data. The light with the adjusted wavelength bandwidth can then be modified, stretched, and displayed again as described in the following section.

The bandwidth can be adjusted to work with a single prism anamorphic adaptor to achieve an optimum image stretch that would not be otherwise possible because of a fat pixel problem that color warping techniques may not be able to correct. Adjusting by reducing the bandwidth of light in a color channel can reduce the angular spread of light exiting a one prism anamorphic adaptor. Effectively, the fat pixel problem can be controlled. Examples of techniques for adjusting color channel bandwidth include adding a color filter, adding an adjustable color filter, having interchangeable color filters, and having interchangeable color wheel filters. An alternate approach can involve designing the light source to have light emissions with the needed wavelength bandwidth profile best suited for the single lens prism anamorphic adaptor to minimize a fat pixel problem. Another approach may be to use a source with as narrow as possible wavelength bandwidth of light for a color channel such as a laser source. A diode laser is an example of one such laser that can be used as a light source with a much reduced fat pixel problem.

In block 824, one color channel of the light is modified with image data to produce modified image light. Image data can be accessed in any number of ways such as from a server in the projection system, from a server that is remote with respect to the projection system, or it can be accessed remotely. Image data can be a feature presentation. An example of a device that can perform the modification is a spatial light modulator (SLM), or otherwise a device that uses electrical input data such as image data to modify received light that is not imaged to produce imaged light. Examples of SLM devices include a Digital Mirror Device (DMD), or Liquid Crystal on Silicon (LCOS) device, or a Liquid Crystal (LC) device. The light received by the SLM can be from a color channel or several color channels. For example, in a typical three color channel system, the color channels can be red, green, and blue. Wideband light sources such as xenon lamps can output a broad spectrum of light in which filters, or a Philips prism, can be used to separate the light into the three color channels. To maintain light at levels that are as high as possible, each light channel can have as large as possible bandwidth within a limited spectrum to ensure much of the light for each color is available to produce a bright image. Digital projection system using SLMs may typically be setup to display the brightest image possible. However, when configuring such systems to display an image that is stretched, the wavelength bandwidth of light for each color can become limiting in terms of how much image stretch can be done.

The image data in block 824 can also be modified image data that has been modified by a color warping processor. Image data can be warped to cause the imaged light from one color channel to converge on to the display screen with imaged light from another color channel. For example, the warping unit 5 in FIG. 3 can perform the convergence function.

In block 832, the projected image from a projection lens can be stretched by a single prism anamorphic adaptor. For example, FIG. 3 illustrates a projection system with a projection lens 4 and a single prism element 6 in which the image is stretched in the vertical direction. The prism element 6 can have a slim prism angle (for example 10 degrees) such that the stretch is not so large and color separation is not as significant. The slim prism can be made of low dispersion glass and be designed such that coma aberrations are minimal and manageable. As the prism angle of the slim prism increases, greater image stretching is possible. With typical projection systems using wideband light sources and separating the light into color channels, the amount of image stretch may be limited by the bandwidth of the light in a color channel.

In block 836, the stretched image is displayed. In theatres images are displayed on projection surfaces or screens. For example, the stretched image can be displayed on a domed projection surface 2 in FIG. 3.

In a second aspect of the invention, in the configurations of FIG. 2 or FIG. 3, the dome shaped projection surface can be substituted by another shape, such as a rectilinear screen which may be a large flat or curved projection surface covering a large fraction of the observer's field of vision so an immersive experience is achieved. The projection surface may have an aspect ratio higher in the vertical direction than the aspect ratio R of the image forming element. The prism 6 and/or the prism 7 may be adjusted so that the image can essentially fill out the projection surface and eliminate "black bars" on the top and bottom of the projection surface.

Figure 7:
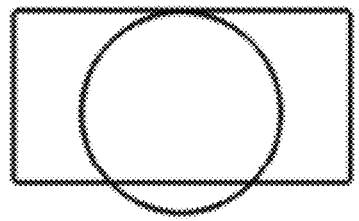
FIG. 7 shows examples of the utilization of an area of the image forming element according to certain aspects of the present invention.
Figure 7:
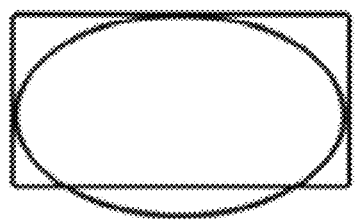

FIG. 7 shows an example of the utilization of the area of the image forming element with and without the anamorphic adapter located in front of the prime lens.

While the present subject matter has been described in detail with respect to specific aspects and examples hereof, those skilled in the art, upon attaining an understanding of the foregoing may readily produce alterations to, variations of, and equivalents to such aspects and examples. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method of digital projection, comprising:
   modifying one color channel of light having a wavelength bandwidth with image data to produce imaged light;
   causing the imaged light to spread angularly when displaying the imaged light through an optical distorting element onto a screen, wherein the optical distorting element causes an angular color separation of the imaged light; and
   reducing angular spread of the imaged light exiting the optical distorting element by adjusting the wavelength bandwidth that reduces the angular color separation of the imaged light appearing on the screen.

2. The method of claim 1, wherein the optical distorting element is a single prism anamorphic adaptor.

3. The method of claim 2, further comprising modifying a magnification of the imaged light in the vertical dimension by the single prism anamorphic adaptor.

4. The method of claim 2, further comprising modifying a magnification of the imaged light in the horizontal dimension by the single prism anamorphic adaptor.

5. The method of claim 1, further comprising:
   modifying a second color channel of light with the image data,
   wherein the image data is modified to cause the imaged light of at least one color channel exiting the optical distorting element to converge on a screen with imaged light from the second color channel exiting the optical distorting element by a color warping processor.

6. The method of claim 1, further comprising designing into light source emissions a required wavelength bandwidth of light of the at least one color channel.

7. A system for digital projection, the system comprising;
   a spatial light modulator adapted for modifying light having a wavelength bandwidth and from at least one color channel with image data to produce imaged light;
   a projection lens adapted to project the imaged light; and
   a single prism anamorphic adaptor at the output of the projection lens and through which the imaged light is configured to be projected for display on a screen, wherein the single prism anamorphic adaptor is configured for causing the light from the at least one color channel to spread angularly,
   wherein the system is adapted for reducing angular spread of the imaged light exiting the optical distorting element by adjusting the wavelength bandwidth.

8. The system of claim 7, further comprising a light source adapted for being designed to include a required wavelength bandwidth into emissions of the light source.

9. The system of claim 8, wherein the light source is a laser light source.

10. The system of claim 9, wherein the laser light source is a laser diode light source.

11. The system of claim 7, further comprising:
    a color warping processor adapted for causing the imaged light exiting the single prism anamorphic to converge on the screen with second imaged light from a second color channel exiting the single prism anamorphic adaptor by modifying the image data.

12. The system of claim 7, further comprising the screen, wherein the screen is a dome screen.

13. The system of claim 7, wherein the system is disposed in a dual projector system.

14. The system of claim 7, wherein the spatial light modulator is a 4K spatial light modulator, wherein the wavelength bandwidth of a light source for one color is configured for being reduced to less than ten nanometers.

15. The system of claim 7, wherein the wavelength bandwidth of a light source is configured for being reduced to less than twenty nanometers.

* * * * *